United States Patent
Röhr et al.

(10) Patent No.: US 11,702,968 B2
(45) Date of Patent: Jul. 18, 2023

(54) COMPONENT FOR AN EXHAUST SYSTEM OF AN INTERNAL COMBUSTION ENGINE

(71) Applicant: Purem GmbH, Neunkirchen (DE)

(72) Inventors: Benjamin Röhr, Esslingen (DE);
Frank Berkemer, Eningen (DE);
Herve Tchamgoue, Bad Urach (DE);
Thomas Müller, Breitenbach (DE)

(73) Assignee: PUREM GMBH, Neunkirchen (DE)

( * ) Notice: Subject to any disclaimer, the term of this patent is extended or adjusted under 35 U.S.C. 154(b) by 406 days.

(21) Appl. No.: 16/903,013

(22) Filed: Jun. 16, 2020

(65) Prior Publication Data
US 2020/0392879 A1    Dec. 17, 2020

(51) Int. Cl.
*F01N 1/02*  (2006.01)
*F01N 13/18*  (2010.01)

(52) U.S. Cl.
CPC .......... *F01N 1/02* (2013.01); *F01N 13/1805* (2013.01); *F01N 13/1855* (2013.01)

(58) Field of Classification Search
CPC .......... F01N 1/00; F01N 1/02; F01N 13/1805; F01N 13/1822; F01N 13/1855; B60K 13/04
See application file for complete search history.

(56) References Cited

U.S. PATENT DOCUMENTS

| | | | |
|---|---|---|---|
| 3,386,529 A | 6/1968 | Pannone | |
| 4,494,722 A * | 1/1985 | Kanai | F01N 13/1822 248/609 |
| 4,596,304 A * | 6/1986 | Teshima | B60K 5/04 180/297 |
| 4,961,403 A | 10/1990 | Kawaguchi et al. | |
| 6,173,800 B1 | 1/2001 | Steenackers et al. | |
| 6,412,587 B1 * | 7/2002 | Weimert | F01N 13/1822 60/322 |
| 9,090,158 B2 | 7/2015 | Fowler et al. | |
| 2008/0142657 A1 | 6/2008 | Ammer | |
| 2012/0152643 A1 * | 6/2012 | Orihashi | F01N 13/1822 248/674 |

FOREIGN PATENT DOCUMENTS

| | | |
|---|---|---|
| CN | 101117090 A | 2/2008 |
| CN | 102562246 A | 7/2012 |
| DE | 19722160 A1 | 12/1997 |
| JP | 2004340114 A | 12/2004 |
| WO | 2012087224 A1 | 6/2012 |

* cited by examiner

*Primary Examiner* — Anthony Ayala Delgado
(74) *Attorney, Agent, or Firm* — McGlew and Tuttle, P.C.

(57) ABSTRACT

A component for an exhaust system of an internal combustion engine includes a component housing (22) elongated in the direction of a housing axis with an exhaust gas inlet (21) and with an exhaust gas outlet (24) and a carrier assembly unit (28) for connecting the component (16) to a carrier structure. The carrier assembly unit (28) includes a carrier rod (46), the carrier rod (46) being fixed to the component housing (22) in at least two fastening areas (60, 62) located at spaced locations from one another along the carrier rod (46). The carrier assembly unit (28) has at least one carrier rod connection area (52, 54) for connection to the carrier structure.

18 Claims, 2 Drawing Sheets

COMPONENT FOR AN EXHAUST SYSTEM OF AN INTERNAL COMBUSTION ENGINE

CROSS REFERENCE TO RELATED APPLICATIONS

This application claims the benefit of priority under 35 U.S.C. § 119 of German Application 10 2019 116 336.6, filed Jun. 17, 2019, the entire contents of which are incorporated herein by reference.

TECHNICAL FIELD

The present invention pertains to a component for an exhaust system of an internal combustion engine, for example a rear muffler provided in an end area of such an exhaust system.

TECHNICAL BACKGROUND

To fasten an exhaust system in a vehicle, a plurality of connection areas, in which such an exhaust system can be fixed on the bottom side of a vehicle, especially in the area of an underbody of the vehicle by generally using connection elements made of elastic material, are provided at such an exhaust system. Two such connection areas are provided in association with different components, for example, rear mufflers, in order to guarantee a stable connection to a vehicle.

SUMMARY

An object of the present invention is to provide a component for an exhaust system of an internal combustion engine, with which a connection to a vehicle, which connection is stable and avoids an excessive load on the component itself, is achieved.

This object is accomplished according to the present invention by a component for an exhaust system of an internal combustion engine, comprising a component housing elongated in the direction of a housing axis with an exhaust gas inlet and with an exhaust gas outlet and a carrier assembly unit for connecting the component to a carrier structure, wherein the carrier assembly unit comprises a carrier rod, the carrier rod being fixed to the component housing in at least two fastening areas located at spaced locations from one another along the carrier rod and having at least one carrier rod connection area for connection to the carrier structure.

By using a carrier rod, which is fastened to the component housing of the component in a plurality of fastening areas, on the one hand, and which can be connected to a carrier structure at a vehicle in at least one carrier rod connection area, on the other hand, a stable mount is guaranteed, at which the forces acting between the carrier structure and the component can for the most part also be transmitted via the carrier rod and thus can be kept away from the component. The carrier rod can be configured such that it is very stable, has low production costs and thus absorbs the forces occurring without the risk of damage.

The component can be configured such that the component housing comprises a circumferential wall elongated in the direction of the housing axis. Since this circumferential wall generally consists of a single component having, for example, a tubular configuration, the load acting on the component can then be kept low by the carrier rod being fastened to the circumferential wall in at least one fastening area. The carrier rod may here advantageously be fastened to the circumferential wall in at least two or all fastening areas.

It is especially advantageous for a stable connection if the fastening areas are spaced apart from one another as much as possible. It is therefore proposed that at least one fastening area be provided in an axial end area of the circumferential wall. Such a fastening area establishing a fixed connection to the carrier rod may preferably be provided in each axial end area of the circumferential wall.

For a stable connection between the carrier rod and the component housing, at least one, preferably each fastening area may comprise a fastening element fixed to the component housing and to the carrier rod.

Further, the fastening element can be fixed by connection in substance, preferably by welding to the component housing or/and to the carrier rod in case of a configuration which can be embodied in a simple and cost-effective manner.

The carrier rod may have two carrier rod end areas for the stable connection to a carrier structure that is provided in a vehicle. At least one, preferably each carrier rod connection area may then be provided at a carrier rod end area.

In order to avoid the transmission of vibrations and impacts between the component and the carrier structure as much as possible in the area of the carrier rod connection areas, it is proposed that at least one, preferably each carrier rod connection area comprise a connection element which is made of elastic material, for example, rubber material, in at least some areas.

To embody a configuration which can be manufactured in a simple manner, it is proposed that the carrier rod be arranged entirely outside of the component housing.

The carrier rod may have a tubular configuration in case of a configuration which is stable and yet provides a low weight.

The carrier rod may be configured as extending essentially linearly between its carrier rod connection areas.

For a connection with low load on the component housing, the carrier rod may be fastened to the component housing in at least two fastening areas arranged at spaced locations from one another in the direction of the housing longitudinal axis. Further, the carrier rod in this case may be arranged extending essentially in the direction of the housing longitudinal axis in its length area interacting with the fastening areas, or/and may be configured as extending essentially linearly.

For the integration of the component into an exhaust system, the exhaust gas inlet may comprise at least one inlet pipe that is preferably connected to a front wall of the component housing. The exhaust gas outlet may comprise at least one outlet pipe, which provides, for example, a tail pipe that is preferably connected to a front wall of the component housing.

The component may be a muffler, preferably a rear muffler.

The present invention further pertains to an exhaust system for an internal combustion engine, especially in a motor vehicle, comprising a component configured according to the present invention.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
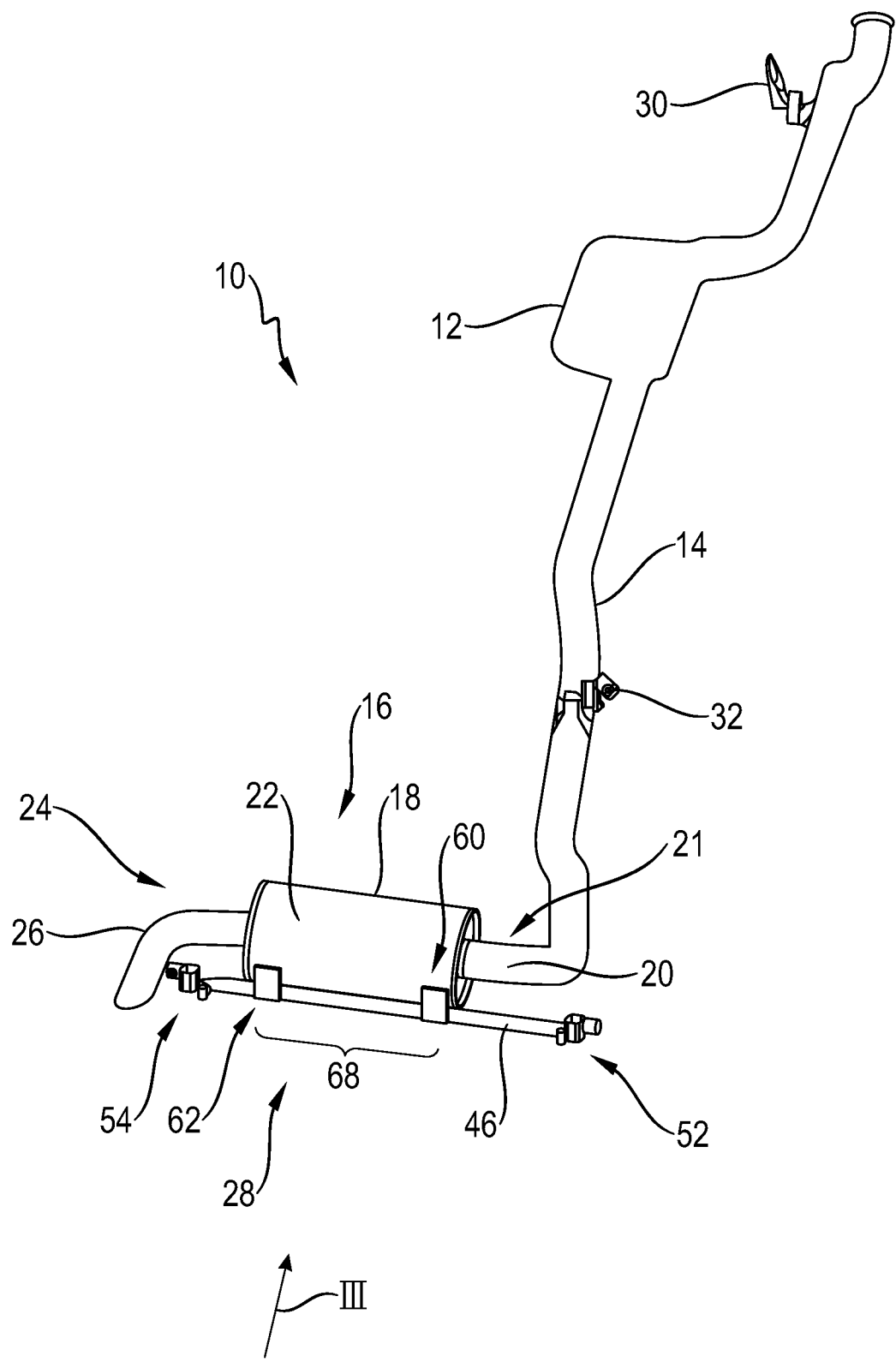
FIG. 1 is a perspective view of an exhaust system for an internal combustion engine in a vehicle.
Figure 2:
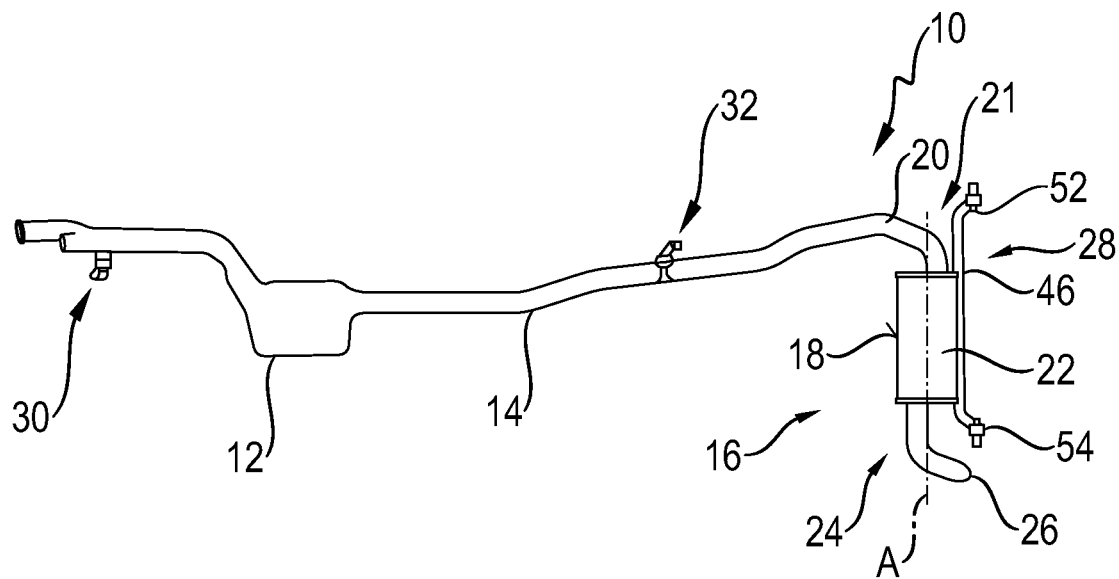
FIG. 2 is a top view of the exhaust system from FIG. 1.
Figure 3:
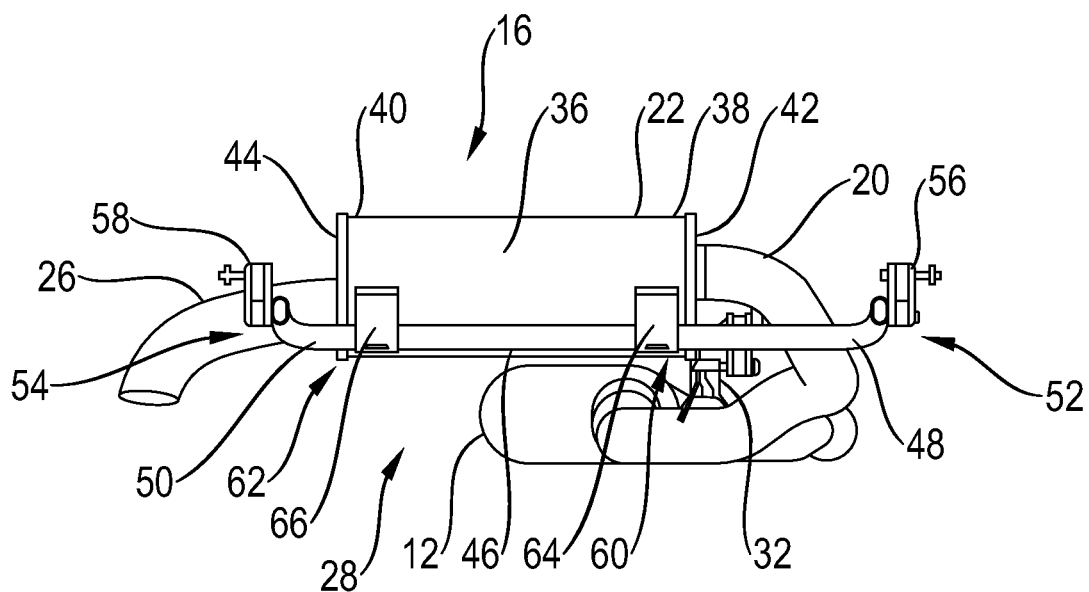
FIG. 3 is a view of the exhaust system from FIG. 1 in viewing direction III in FIG. 1.

Referring to the drawings, an exhaust system for an internal combustion engine in a vehicle is generally designated by 10 in FIGS. 1-3. The exhaust system 10 comprises in an upstream area an exhaust gas treatment unit 12 to be connected to an internal combustion engine, for example, via an outlet elbow, not shown. This exhaust gas treatment unit 12 may comprise, for example, a catalytic converter, a particle filter, a main muffler or the like. An exhaust gas pipe 14 following the exhaust gas treatment unit 12 leads to a component 16 of the exhaust system 10, which is configured as a rear muffler 18 in the example shown. In this case, an end area of the exhaust gas pipe 14, which end area provides an inlet pipe 20 of an exhaust gas inlet 21, leads into a component housing 22 of the component 16 or of the rear muffler 18. An outlet pipe 26 providing an exhaust gas outlet 24 in the form of a tail pipe leads out of the component housing 22.

The exhaust system 10 may be connected to a carrier structure in a vehicle, for example, in the area of an underbody, or suspended thereon via connection areas 30, 32 upstream or downstream of the exhaust gas treatment unit 12. A carrier assembly unit 28, by means of which the component 16 can be fixed or suspended at the carrier structure, is provided in association with the component, which is configured as a rear muffler 18.

Forces acting between the carrier structure and the component 16 or the component housing 22 are transmitted via the component housing 22 especially in the area of the connection of the component 16 to the carrier structure of a vehicle for generating a backflow of forces. This may lead to heavy loads, so that the component housing 22 must have a correspondingly stable configuration.

In case of the exhaust system shown in FIGS. 1-3, such forces are extensively kept away from the component housing 22. As can be clearly seen in FIG. 2, the component housing 22 comprises a circumferential wall 36 that has, for example, a cylindrical configuration and is elongated in the direction of a housing longitudinal axis A. Front walls 42, 44 that are permanently connected to the circumferential wall 36 by positive locking or/and by connection in substance are provided at both axial end areas 38, 40 of the circumferential wall 36. The inlet pipe 20 is connected to the front wall 42. The outlet pipe 26 is connected to the front wall 44.

The carrier assembly unit 28 provided for connection of the component 16 to a carrier structure of a vehicle comprises a carrier 46, e.g., made of metallic material, which is configured, for example, as a pipe, i.e., has a tubular configuration and extends entirely outside of the component housing 22. This carrier rod is configured as extending essentially linearly between its carrier rod end areas 48, 50 and provides a carrier rod connection area 52, 54 in each of its end areas 48, 50. For example, the carrier rod 46 may be bent over in the two carrier rod end areas 48, 50 and may be connected to respective connection elements 56, 58 in the bent-over areas. These connection elements 56, 58 may be connected to the carrier rod 46, for example, by screw connection or/and by connection in substance and have transmission elements made of elastic material, e.g., rubber material. These connection elements 56, 58 may be fixed, for example, by screw connection to the carrier structure of a vehicle.

The carrier rod 46 in the example shown can be fastened to the component housing 22 in two fastening areas 60, 62, which are arranged at spaced locations from one another, especially provided in the end areas 38, 40 of the component housing 22 and of the circumferential wall 36. Each of the fastening areas 60, 62 may comprise a fastening element 64 or 66, which is configured, for example, as a strap, is preferably fixed by welding to the outer side of the circumferential wall 36 of the component housing 22, and which can also be fixed by welding to the carrier rod 46. In its length area 68 provided for fastening to the component housing 22 and interacting with the fastening areas 60, 62, the carrier rod 46 extends essentially in the direction of the housing axis A and is configured as extending essentially linearly, just as in its longitudinal sections, which are also located outside of the length area 68.

An exhaust system 10 configured with such a component 16 is connected to the carrier structure of a vehicle in the area of the two connection areas 52, 54 of the carrier rod 46. A comparatively great distance of the connection areas 52, 54 providing the connection to the carrier structure is, as a result, guaranteed, which is or may be markedly greater than the distance of the fastening areas 60, 62 acting between the carrier rod 46 and the component housing 22. The two fastening areas 60, 62 also have a comparatively great distance from one another, since they act each in the end areas 38, 40 of the component housing 22, i.e., they have a shorter distance at a respective axial end, for example, of the circumferential wall 36 or at the front walls 42, 44 fixed thereto than at the axial central area of the circumferential wall 36.

A connection to a vehicle, which is provided with a comparatively low number of components, is stable and has a low load on the component 16, is guaranteed by using the carrier assembly unit 28 shown in FIGS. 1-3.

It should be noted that a component configured according to the present invention or the carrier assembly unit 28 provided for this component could also be configured differently than shown. Thus, for example, the component housing 22, unlike as shown in FIG. 2, may not be configured with a circumferential wall and front walls provided each at the two end areas thereof as separate components, but rather, just as shown in FIG. 1 in connection with the exhaust gas treatment unit 12, with two half shells, each of which provides a part of the circumferential wall and a part of the two front walls. More than two fastening areas 60, 62 might be provided, and the carrier rod 46 might have a curved configuration in some areas, for example, in an area located outside of the length area 68, for adaptation to the carrier structure of a vehicle.

While specific embodiments of the invention have been shown and described in detail to illustrate the application of the principles of the invention, it will be understood that the invention may be embodied otherwise without departing from such principles.

What is claimed is:

1. An internal combustion engine exhaust system component comprising:

a component housing elongated in a direction of a housing axis, the component housing comprising a circumferential wall elongated in the direction of the housing axis and a first front wall fixed to one axial end area of the circumferential wall and a second front wall fixed to another axial end area of the circumferential wall, the component housing having an exhaust gas inlet and an exhaust gas outlet, the exhaust gas inlet comprising at least one inlet pipe connected to the first front wall of the component housing and the exhaust gas outlet comprising at least one outlet pipe connected to the second front wall of the component housing; and a carrier assembly unit configured to connect the component to a carrier structure, wherein the carrier assembly unit comprises a carrier rod fixed to the circumferential wall of the component housing in at least two fastening areas located at spaced locations from one another along the carrier rod in the direction of the housing longitudinal axis, one of the fastening areas comprising a fastening element fixed to the carrier rod and fixed to the component housing at the one axial end area of the circumferential wall and another one of the fastening areas comprising another fastening element fixed to the carrier rod and fixed to the component housing at the other axial end area of the circumferential wall, the carrier rod having two carrier rod end areas, a carrier rod connection area configured to connect to the carrier structure being provided at each one of the two carrier rod end areas, an axial distance between the carrier rod connection areas provided at the carrier rod end areas being greater than an axial distance between the first and second front walls provided at the end areas of the circumferential wall.

2. The exhaust system component in accordance with claim 1, wherein:
each fastening element is fixed by a connection in substance to the component housing; or
each fastening element is fixed by a connection in substance to the carrier rod; or
each fastening element is fixed by a connection in substance to the component housing and is fixed by another connection in substance to the carrier rod.

3. The exhaust system component in accordance with claim 1, wherein at least one carrier rod connection area comprises a connection element made of elastic material in at least some areas.

4. The exhaust system component in accordance with claim 1, wherein:
the carrier rod is arranged entirely outside of the component housing; or
the carrier rod has a tubular configuration; or
the carrier rod is arranged entirely outside of the component housing and has a tubular configuration.

5. The exhaust system component in accordance with claim 1, wherein
the carrier rod is configured so as to extend essentially linearly between the carrier rod connection areas.

6. The exhaust system component in accordance with claim 1, wherein
the carrier rod is arranged extending essentially in a direction of the housing longitudinal axis in a length area interacting with the fastening areas, or/and is configured as extending essentially linearly.

7. The exhaust system component in accordance with claim 1, wherein the component is a muffler.

8. An exhaust system for an internal combustion engine, the exhaust system comprising an exhaust system component comprising:

a component housing elongated in a direction of a housing axis, the component housing comprising a circumferential wall elongated in the direction of the housing axis and a first front wall fixed to one axial end area of the circumferential wall and a second front wall fixed to another axial end area of the circumferential wall, the component housing having an exhaust gas inlet and an exhaust gas outlet, the exhaust gas inlet comprising at least one inlet pipe connected to the first front wall of the component housing and the exhaust gas outlet comprising at least one outlet pipe connected to the second front wall of the component housing; and a carrier assembly unit configured to connect the component to a carrier structure, wherein the carrier assembly unit comprises a carrier rod fixed to the circumferential wall of the component housing in at least two fastening areas located at spaced locations from one another along the carrier rod in the direction of the housing longitudinal axis, one of the fastening areas comprising a fastening element fixed to the carrier rod and fixed to the component housing at the one axial end area of the circumferential wall and another one of the fastening areas comprising another fastening element fixed to the carrier rod and fixed to the component housing at the other axial end area of the circumferential wall, the carrier rod having two carrier rod end areas, a carrier rod connection area configured to connect to the carrier structure being provided at each one of the two carrier rod end areas, an axial distance between the carrier rod connection areas provided at the carrier rod end areas being greater than an axial distance between the first and second front walls provided at the end areas of the circumferential wall.

9. The exhaust system in accordance with claim 8, wherein:
each fastening element is fixed by a connection in substance to the component housing; or
each fastening element is fixed by a connection in substance to the carrier rod; or
each fastening element is fixed by a connection in substance to the component housing and is fixed by another connection in substance to the carrier rod.

10. The exhaust system in accordance with claim 8, wherein at least one carrier rod connection area comprises a connection element made of elastic material in at least some areas.

11. The exhaust system in accordance with claim 8, wherein:
the carrier rod is arranged entirely outside of the component housing; or
the carrier rod has a tubular configuration; or
the carrier rod is arranged entirely outside of the component housing and has a tubular configuration.

12. An internal combustion engine exhaust system component comprising:
a component housing elongated in a direction of a housing axis, the component housing comprising an exhaust gas inlet, an exhaust gas outlet, a circumferential wall, a first front wall and a second front wall, the circumferential wall being elongated in the direction of the housing axis, the circumferential wall comprising a first circumferential wall axial end area and a second circumferential wall axial end area, the first front wall being fixed to one of the first circumferential wall axial end area and the second circumferential wall axial end area, the second front wall being fixed to another one of the first circumferential wall axial end area and the second circumferential wall axial end area, the first front wall and the second front wall defining a first axial distance with respect to the housing axis, wherein at least one inlet pipe is connected to the first front wall and at least one outlet pipe is connected to the second front wall of the component housing, the at least one inlet pipe being in fluid communication with the exhaust gas inlet, the at least one outlet pipe being in fluid communication with the exhaust gas outlet; and a carrier assembly unit configured to connect the component to a carrier structure, wherein the carrier assembly unit comprises a carrier rod fixed to the circumferential wall of the component housing in at least a first fastening area and a second fastening area, the first fastening area being located at spaced location from the second fastening area in the direction of the housing longitudinal axis, one of the first fastening area and the second fastening area comprising a first fastening element fixed to the carrier rod and fixed to the component housing at one of the first circumferential wall axial end area and the second circumferential wall axial end area, another one of the first fastening area and the second fastening area comprising a second fastening element fixed to the carrier rod and fixed to the component housing at another one of the first circumferential wall axial end area and the second circumferential wall axial end area, the carrier rod having a first carrier rod end area and a second carrier rod end area, the first carrier rod end area comprising a first carrier rod connection area, the second carrier rod end area comprising a second carrier rod connection area, the first carrier rod connection area and the second carrier rod connection area being configured to connect to the carrier structure, the first carrier rod connection area and the second carrier rod connection area defining a second axial distance with respect to the housing axis, the second axial distance being greater than the first axial distance.

13. The exhaust system component in accordance with claim 12, wherein:
   each of the first fastening element and the second fastening element is fixed by a connection in substance to the component housing; or
   each of the first fastening element and the second fastening element is fixed by a connection in substance to the carrier rod; or
   each of the first fastening element and the second fastening element is fixed by a connection in substance to the component housing and is fixed by another connection in substance to the carrier rod.

14. The exhaust system component in accordance with claim 12, wherein at least one carrier rod connection area comprises a connection element made of elastic material in at least some areas.

15. The exhaust system component in accordance with claim 12, wherein:
   the carrier rod is arranged entirely outside of the component housing; or
   the carrier rod has a tubular configuration; or
   the carrier rod is arranged entirely outside of the component housing and has a tubular configuration.

16. The exhaust system component in accordance with claim 12, wherein the carrier rod is configured so as to extend essentially linearly between the first carrier rod connection area and the second carrier rod connection area.

17. The exhaust system component in accordance with claim 12, wherein the carrier rod is arranged extending essentially in a direction of the housing longitudinal axis in a length area interacting with the first fastening area and the second fastening area, and/or is configured as extending essentially linearly.

18. The exhaust system component in accordance with claim 12, wherein the component is a muffler.

\* \* \* \* \*

UNITED STATES PATENT AND TRADEMARK OFFICE
CERTIFICATE OF CORRECTION

PATENT NO. : 11,702,968 B2
APPLICATION NO. : 16/903013
DATED : July 18, 2023
INVENTOR(S) : Röhr et al.

Page 1 of 1

It is certified that error appears in the above-identified patent and that said Letters Patent is hereby corrected as shown below:

On the Title Page

Item (30) Foreign Application Priority Data should read:
June 17, 2019 (DE) ........................ 10 2019 116 336

Signed and Sealed this
Twenty-fourth Day of October, 2023

Katherine Kelly Vidal
*Director of the United States Patent and Trademark Office*